US012311672B2

(12) United States Patent
Watanabe

(10) Patent No.: US 12,311,672 B2
(45) Date of Patent: May 27, 2025

(54) LIQUID DISCHARGE HEAD, LIQUID DISCHARGE DEVICE, LIQUID DISCHARGE APPARATUS, AND LIQUID CIRCULATION APPARATUS

(71) Applicant: Yu Watanabe, Kanagawa (JP)

(72) Inventor: Yu Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 205 days.

(21) Appl. No.: 18/107,525

(22) Filed: Feb. 9, 2023

(65) Prior Publication Data

US 2023/0286277 A1 Sep. 14, 2023

(30) Foreign Application Priority Data

Mar. 11, 2022 (JP) ................................ 2022-038308

(51) Int. Cl.
*B41J 2/175* (2006.01)
*B41J 2/165* (2006.01)

(52) U.S. Cl.
CPC ....... *B41J 2/17563* (2013.01); *B41J 2/16552* (2013.01)

(58) Field of Classification Search
CPC .................................................. B41J 2/17563
See application file for complete search history.

(56) References Cited

U.S. PATENT DOCUMENTS

| | | | | | |
|---|---|---|---|---|---|
| 2005/0104943 | A1* | 5/2005 | Hida | B41J 2/18 | 347/93 |
| 2015/0273847 | A1* | 10/2015 | Mizuno | B41J 2/17563 | 347/93 |
| 2016/0288499 | A1* | 10/2016 | Sugahara | B41J 2/14233 | |
| 2016/0297195 | A1 | 10/2016 | Takeuchi | | |
| 2019/0299640 | A1* | 10/2019 | Koide | B41J 2/17563 | |

FOREIGN PATENT DOCUMENTS

| | | | |
|---|---|---|---|
| JP | 2012-245725 | 12/2012 | |
| JP | 2016-199032 | 12/2016 | |
| JP | 2019155834 A * | 9/2019 | B08B 15/023 |
| JP | 2020-049818 | 4/2020 | |

* cited by examiner

*Primary Examiner* — Shelby L Fidler
(74) *Attorney, Agent, or Firm* — XSENSUS LLP

(57) ABSTRACT

A liquid discharge head includes: multiple nozzles though which a liquid is to be discharged, each of the multiple nozzles having a nozzle diameter; a multiple pressure chambers respectively communicating with the multiple nozzles; a supply common chamber communicating with each of the multiple pressure chambers to supply the liquid to each of the multiple pressure chambers; a collection common chamber communicating with each of the multiple pressure chambers to collect the liquid from the multiple pressure chambers; a supply port communicating with the supply common chamber to supply the liquid to the supply common chamber; a discharge port communicating with the collection common chamber to discharge the liquid from the collection common chamber; and a first filter between the supply port and the pressure chamber, the first filter having first multiple openings each having a first diameter smaller than the nozzle diameter.

12 Claims, 5 Drawing Sheets

LIQUID DISCHARGE HEAD, LIQUID DISCHARGE DEVICE, LIQUID DISCHARGE APPARATUS, AND LIQUID CIRCULATION APPARATUS

CROSS-REFERENCE TO RELATED APPLICATIONS

This patent application is based on and claims priority pursuant to 35 U.S.C. § 119(a) to Japanese Patent Application No. 2022-038308, filed on Mar. 11, 2022, in the Japan Patent Office, the entire disclosure of which is hereby incorporated by reference herein.

BACKGROUND

Technical Field

The present embodiment relates to a liquid discharge head, a liquid discharge device, a liquid discharge apparatus, and a liquid circulation apparatus.

Related Art

As an inkjet head used in, for example, an inkjet-type image forming apparatus, there is a piezo-type inkjet head including a piezoelectric element and a pressure chamber. Deformation of the piezoelectric element due to application of a voltage makes a change in the volume of the pressure chamber, so that ink in the pressure chamber is extruded and discharged.

Such an inkjet head discharges ink from a nozzle portion of about ten and several microns, and ink has to be continuously supplied to the pressure chamber. In order to improve the stability in supply while maintaining the viscosity of the discharged ink constant depending on a head, the ink is supplied from the upstream side of the inkjet head through a pump or the like, and a collection port is provided on the downstream side of the pressure chamber to circulate the ink.

In use of such a circulation-type inkjet head including a pressure chamber having a supply port and a collection port each provided with a filter, the filters trap impurities in the ink to remove foreign matter from the ink supplied and collected.

SUMMARY

In an aspect of the present disclosure, a liquid discharge head includes: multiple nozzles though which a liquid is to be discharged, each of the multiple nozzles having a nozzle diameter; a multiple pressure chambers respectively communicating with the multiple nozzles; a supply common chamber communicating with each of the multiple pressure chambers to supply the liquid to each of the multiple pressure chambers; a collection common chamber communicating with each of the multiple pressure chambers to collect the liquid from the multiple pressure chambers; a supply port communicating with the supply common chamber to supply the liquid to the supply common chamber; a discharge port communicating with the collection common chamber to discharge the liquid from the collection common chamber; a first filter between the supply port and the pressure chamber, the first filter having first multiple openings each having a first diameter smaller than the nozzle diameter; and a second filter between the discharge port and the pressure chamber, the second filter having second multiple openings each having a second diameter larger than the nozzle diameter.

BRIEF DESCRIPTIONS OF DRAWINGS

A more complete appreciation of embodiments of the present disclosure and many of the attendant advantages and features thereof can be readily obtained and understood from the following detailed description with reference to the accompanying drawings, wherein.

Figure 1:
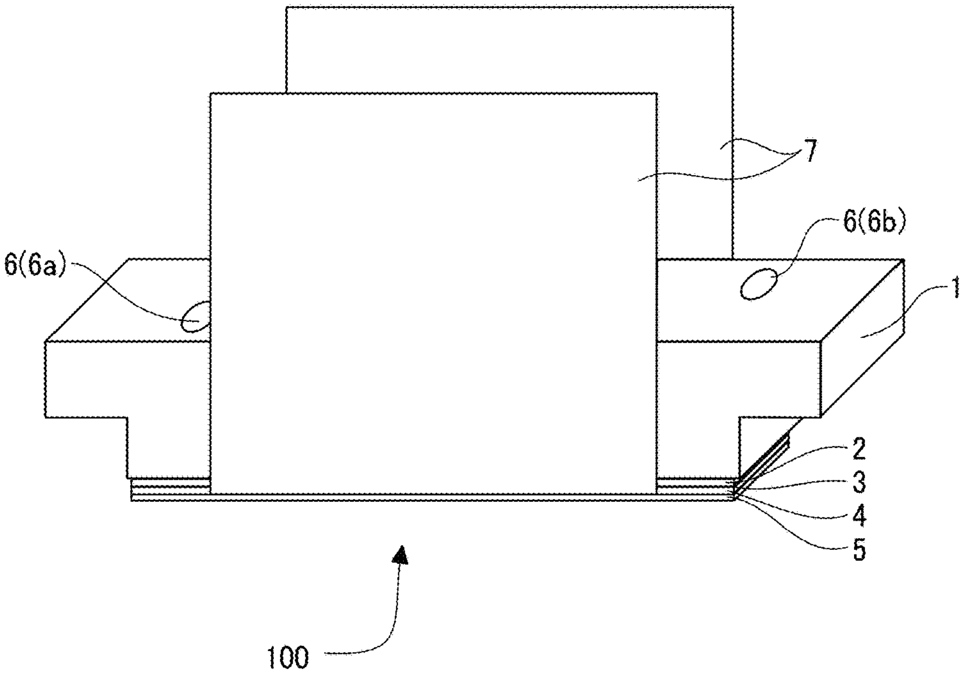
FIG. 1 is an exemplary view illustrating a configuration of a liquid discharge head according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

As an inkjet head as a liquid discharge head of the present embodiment, a liquid discharge head 100 including a piezoelectric element serving as a driving device is described below.

The liquid discharge head 100 of the present embodiment is a circulation-type liquid discharge head. As illustrated in FIG. 1, the liquid discharge head 100 includes a first liquid chamber substrate 2, a damper 3, a second liquid chamber substrate 4, and a nozzle substrate 5 layered and joined together. Further, the liquid discharge head 100 is provided with a supply port 6*a*, and a collection port 6*b* as a discharge port. From the collection port 6*b*, the liquid discharge head 100 discharges a liquid having flown from the supply port 6*a* to circulate the liquid.

The liquid discharge head 100 further includes a head frame member 1 that serves as a head housing portion, and a flexible printed circuit board 7 as a flexible printed circuits (FPC).

The supply port 6*a* as a supply-side ink passage hole and the collection port 6*b* as a collection-side ink passage hole of the liquid discharge head 100 are each connected through a tube 456 for forming a channel as described later.

Figure 2:
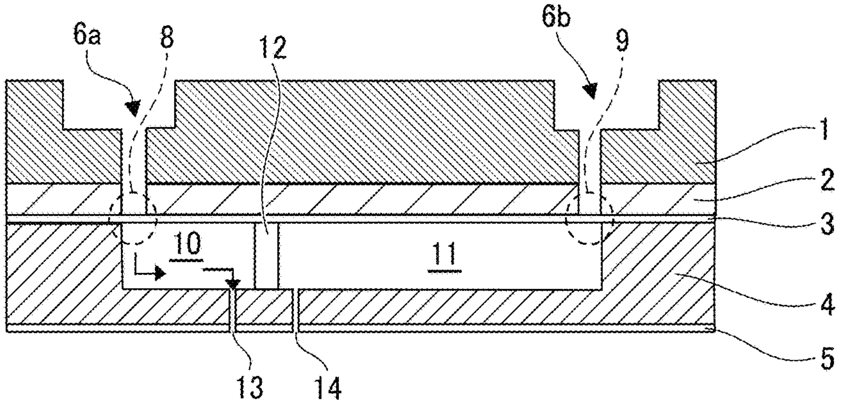
FIG. 2 is an exemplary view illustrating the configuration of the liquid discharge head in FIG. 1.
Figure 3:
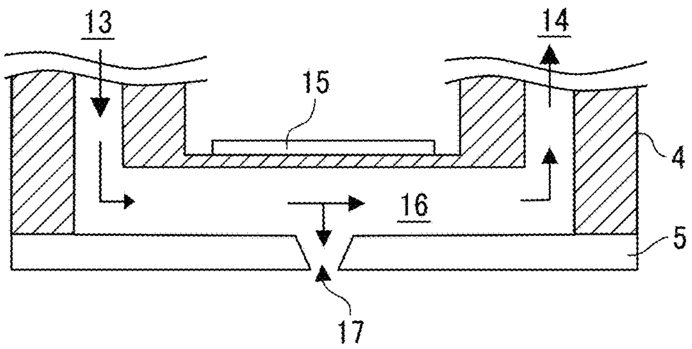
FIG. 3 is an enlarged view of an exemplary configuration of a nozzle portion of the liquid discharge head in FIG. 2.

FIGS. 2 and 3 are schematic cross-sectional views of the liquid discharge head 100.

The second liquid chamber substrate 4 has a supply-side common chamber 10 and a collection-side common chamber 11 inside the second liquid chamber substrate 4. The supply-side common chamber 10 and the collection-side common chamber 11 are blocked by a partition wall 12. The supply-side common chamber 10 and the collection-side common chamber 11 may be integrated into a single common chamber, but are desirably separated by the partition wall 12 in order to easily form the flow of ink P flowing from the supply port 6*a* and the flow of ink P discharged from the collection port 6*b*.

As illustrated in FIG. 3, the second liquid chamber substrate 4 is provided with a multiple pressure chambers 16 inside therein. Such a pressure chamber 16 as described above is in connection with the supply-side common chamber 10 and the collection-side common chamber 11. The pressure chamber 16 is provided with a piezoelectric actuator 15. The piezoelectric actuator 15 presses a wall face that forms the pressure chamber 16 so that ink P as liquid is discharged due to a change in the volume of the pressure chamber 16. With such a configuration as above, in the present embodiment, the supply-side common chamber functions as a supply common chamber for supplying the liquid to the multiple pressure chambers 16. The collection-side common chamber 11 functions as a collection common chamber for collecting the liquid from the multiple pressure chambers 16.

The nozzle substrate 5 has a nozzle hole 17 that is an opening as a nozzle for discharging the ink P.

A supply-side filter 8 is provided at the boundary between the damper 3 and the supply-side common chamber 10. Similarly, a collection-side filter 9 is provided at the boundary between the damper 3 and the collection-side common chamber 11.

The supply-side common chamber 10 is provided with a pressure chamber inlet 13 as an opening hole for flowing the ink P into such a pressure chamber 16 as described above, on the side opposite to the supply-side filter 8. The collection-side common chamber 11 is provided with a pressure chamber outlet 14 for collecting the ink P from the pressure chamber 16.

The ink P as liquid flowing from the supply port 6*a* passes the supply-side filter 8 and flows into the supply-side common chamber 10 through an opening provided between the first liquid chamber substrate 2 and the second liquid chamber substrate 4 as indicated by an arrow in FIG. 2. Further, the ink P flows into the pressure chamber 16 through the pressure chamber inlet 13, and part of the ink P is discharged from the nozzle hole 17 by the corresponding piezoelectric actuator 15. The remaining of the ink P moves to the collection-side common chamber 11 through the pressure chamber outlet 14, and then moves to the collection port 6*b* through the collection-side filter 9. For example, the tip of the collection port 6*b* is connected, though the tube 456, to an ink tank 205 serving as such a liquid storage as described later, a pump serving as a drive source for circulating the ink P, and others.

With this arrangement, the supply-side filter 8 functions as a first filter "provided between the supply port 6*a* and the pressure chamber 16" and the collection-side filter 9 functions as a second filter "provided between the collection port 6*b* and the pressure chamber 16" in the present embodiment.

The supply-side filter 8 may be disposed at any position between the supply port 6*a* and the pressure chambers 16, but is particularly preferably disposed between the supply port 6*a* and the supply-side common chamber 10 as described in the present embodiment. Similarly, the collection-side filter 9 may be disposed at any position between the collection port 6*b* and the pressure chamber 16, but is particularly preferably disposed between the collection port 6*b* and the collection-side common chamber 11.

Such dispositions facilitate removal of foreign matter having temporarily entered, while preventing the foreign matter from entering inside the liquid discharge head 100.

Through a wall face of the pressure chamber 16 inside the second liquid chamber substrate 4, disposed is the piezoelectric actuator 15 including an electromechanical transducer as a driving device (actuator or pressure generator) that causes the wall face to deform.

The piezoelectric actuator 15 is a piezoelectric driver formed by grooving with half-cut dicing a piezoelectric member bonded on a base member to form a desired number of columnar piezoelectric elements in a comb shape at predetermined intervals in a nozzle array direction, and is a device that makes a change in the volume of the pressure chamber 16 by electrical control through the printed circuit board 7.

The piezoelectric actuator 15 has piezoelectric layers and internal electrodes layered alternately. Each of the internal electrodes is extended from an end face of the piezoelectric actuator 15 and connected to an external electrode (end face electrode). The printed circuit board 7 that is also a flexible wiring member is connected with the external electrode.

With such a configuration, in the liquid discharge head 100, for example, contraction of the piezoelectric element due to a decrease in the voltage applied thereto from a reference potential (intermediate potential) causes expansion of the volume of the pressure chamber 16, so that the liquid flows into the pressure chamber 16.

Conversely, extension of the piezoelectric element in the layering direction due to an increase in the voltage applied to the piezoelectric element causes deformation of the upper wall face of the pressure chamber 16 in a direction toward the nozzle hole 17. The volume of the pressure chamber 16 decreases due to the deformation, so that the liquid in the pressure chamber 16 is pressurized and the liquid is discharged from the nozzle hole 17.

Figure 4:
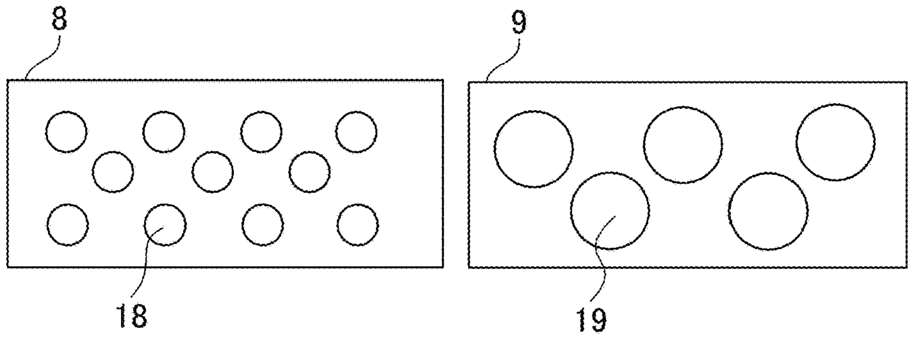
FIG. 4 is a schematic view for comparison in configuration of respective openings of a first filter and a second filter.

FIG. 4 is a view illustrating the opening 18 of the filter attached to the supply-side filter 8 and the opening 19 of the filter attached to the collection-side filter 9.

As illustrated in FIG. 4, the opening 18 that the supply-side filter 8 is provided with and the opening 19 that the collection-side filter 9 is provided with are different in diameter, and the opening 18 of the supply-side filter 8 is smaller in diameter than the opening 19 of the collection-side filter 9. The filter of the supply-side filter 8 and the filter of the collection-side filter 9 are the same in size, and provided such that the total sum $S_{in}$, of the opening area of the opening 18 of the filter that the supply-side filter 8 is provided with and the total sum $S_{out}$ of the opening area of the opening 19 of the filter that the collection-side filter 9 is provided with are substantially identical.

Figure 5:
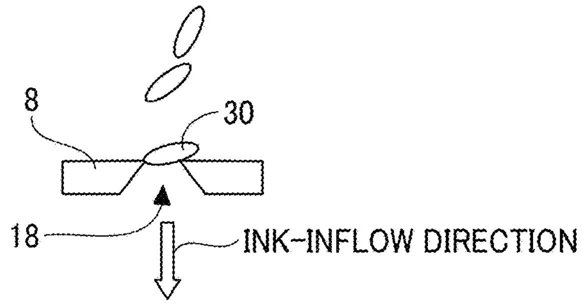
FIG. 5 is a view illustrating a shape of the first filter in a longitudinal cross-sectional direction.

As illustrated in FIG. 5, the opening 18 of the supply-side filter 8 of the present embodiment has a tapered shape, and has an upstream-side diameter and a downstream-side diameter larger than the upstream-side diameter in the direction in which ink flows indicated by the arrow in FIG. 5.

In other words, the supply-side filter 8 has the tapered opening 18 having a diameter closer to the nozzle hole 17 and a diameter farther from the nozzle hole 17, and the diameter closer to the nozzle hole 17 is larger than the diameter farther from the nozzle hole 17.

Figure 6:
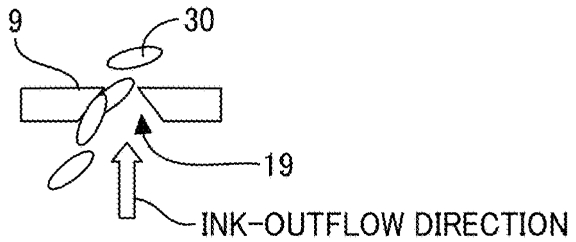
FIG. 6 is a view illustrating a shape of the second filter in the longitudinal cross-sectional direction.

As illustrated in FIG. 6, the opening 19 of the collection-side filter 9 of the present embodiment has a tapered shape, and has an upstream-side diameter and a downstream-side diameter smaller than the upstream-side diameter in the direction in which ink flows indicated by the arrow in FIG. 6.

In other words, the collection-side filter 9 has the tapered opening 19 having a diameter closer to the nozzle hole 17 and a diameter farther from the nozzle hole 17, and the diameter closer to the nozzle hole 17 is larger than the diameter farther from the nozzle hole 17.

As described above, if the diameters of the openings 18 and 19 are each made such that the diameter closer to the nozzle hole 17 is larger than the diameter farther from the nozzle hole 17, foreign matter 30 that tries to enter beyond the supply-side filter 8 as illustrated in FIG. 5 is less likely to enter the supply-side common chamber 10. The foreign matter 30, however, is located obliquely as illustrated in FIG. 6 because the upstream-side diameter of the opening 19 of the collection-side filter 9 is larger than the downstream-side diameter thereof. Therefore, foreign matter 30 that is smaller in diameter than the opening 19 and is elongated passes easily the opening 19.

Conventionally, it has been known to provide such a filter at any position in a common chamber or a channel for collection of foreign matter mixed in ink.

A conventional filter F, however, is provided such that foreign matter simply contained in supplied or collected ink does not enter a head. For example, in a case where foreign matter is once mixed in the head for some reason, the foreign matter is not removed automatically. Thus, clogging of a nozzle may occur disadvantageously, or there is a concern that clogging of the filter may occur, for example.

Figure 7:
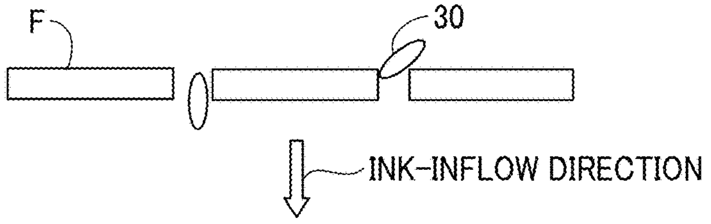
FIG. 7 is a schematic view illustrating an exemplary case where foreign matter enters an ink head in use of a conventional filter.

For example, as illustrated in FIG. 7, elongated foreign matter 30 having a small diameter and a long overall length may have a risk that the foreign matter 30 may pass the opening of the filter F depending on the orientation of the foreign matter 30. Although such foreign matter 30 does not enter unless the orientation is identical appropriately, if the foreign matter 30 enters once for the same reason, the foreign matter 30 is unlikely to be discharged without permission.

Entry of foreign matter into the liquid discharge head 100 may be disadvantageous in that, for example, the nozzle hole 17 is clogged. In addition to the effect of preventing entry of foreign matter 30 into the head, such a filter preferably removes foreign matter from the inside of the liquid discharge head 100 immediately if the foreign matter has entered.

Therefore, the liquid discharge head 100 of the present embodiment has the opening 18 that the supply-side filter 8 is provided with and the opening 19 that the collection-side filter 9 is provided with are different in diameter. The opening diameter of the opening 18 that the supply-side filter 8 is provided with is smaller than the diameter of the nozzle hole 17. The opening diameter of the opening 19 that the collection-side filter 9 is provided with is larger than the nozzle hole 17.

With such a configuration, the opening 18 that the supply-side filter 8 is provided with and the opening 19 that the collection-side filter 9 is provided with are different in diameter, and the opening 18 of the supply-side filter 8 is smaller in diameter than the opening 19 of the collection-side filter 9. Even if foreign matter is mixed as an impurity in ink P, the foreign matter fails to enter the supply-side common chamber 10 by the supply-side filter 8. Further, even if elongated foreign matter has passed the supply-side filter 8 as illustrated in FIG. 5, the elongated foreign matter easily passes the collection-side filter 9 that is coarser than the supply-side filter 8. As a result, there is little risk that such foreign matter remains in a head portion of the liquid discharge head 100.

Further, because the diameter of the opening 19 of the collection-side filter 9 is larger than the opening diameter of the nozzle hole 17, foreign matter having entered is more likely to pass the opening 19 of the collection-side filter 9 and be discharged from the inside of the liquid discharge head 100 than to be discharged from the nozzle hole 17.

Therefore, the foreign matter having entered the head of the liquid discharge head 100 or a substance having been generated in the head can be easily discharged outside the head.

In the case of such a finer filter, its filter portion may block the flow of ink, leading to deterioration of the flow of ink.

Therefore, in the present embodiment, the supply-side filter 8 and the collection-side filter 9 are further provided such that the total opening area of the supply-side filter 8 and the total opening area of the collection-side filter 9 are substantially identical.

With this arrangement, the amount of ink flowing into the supply-side common chamber 10 and the amount of ink flowing out from the collection-side common chamber 11 become uniform to some extent according to the opening areas, so that foreign matter can be removed without hindering the flow.

In the present embodiment, the supply-side filter 8 and the collection-side filter 9 each have the tapered opening having the diameter closer to the nozzle hole 17 and the diameter farther from the nozzle hole 17, and the diameter closer to the nozzle hole 17 is larger than the diameter farther from the nozzle hole 17.

With this arrangement, the supply-side filter 8 has the upstream-side diameter smaller in the flow direction, which makes foreign matter 30 difficult to flow into the supply-side common chamber 10, whereas the collection-side filter 9 has the upstream-side diameter larger in the flow direction and has the shape that enables foreign matter 30 to more easily move toward the downstream side.

As described above, due to such a tapered shape and a larger diameter closer to the nozzle hole 17, foreign matter 30 is less likely to enter the head. Even if the foreign matter has entered, the foreign matter 30 is likely to be quickly discharged before being clogged in the nozzle hole 17. As a result, clogging of the nozzle hole 17 can be prevented.

Figure 8:
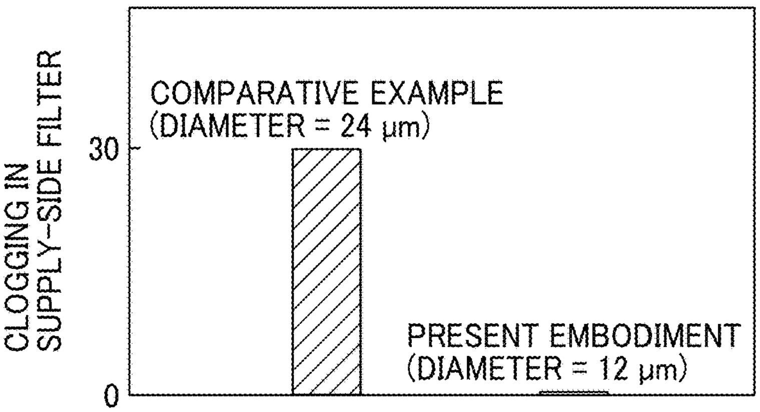
FIG. 8 illustrates an exemplary effect of a configuration of the present embodiment.

FIG. 8 illustrates, as a numerical example of the present embodiment, a comparison of the number of clogged nozzle holes 17 when the diameter of each nozzle hole 17 is 24 μm and the diameter of the opening 18 of the supply-side filter 8 is 12 μm.

In FIG. 8, in order to facilitate understanding of the difference, an inspection liquid with foreign matter of 20 to 30 μm intentionally mixed in ink was caused to flow into the head. FIG. 8 illustrates the number of clogged nozzle holes 17 to 800 channels of nozzle holes 17 per head. FIG. 8 also illustrates, as a comparative example, the number of clogged nozzle holes 17 with a filter having an opening diameter of 24 μm that is the same as the diameter of each nozzle hole 17 was inserted at the same position as the supply-side filter 8. As illustrated in FIG. 8, it was clear that 30 channels are clogged in the case of 24 μm as the comparative example, whereas no clogging occurred in the present embodiment.

According to the numerical example with the comparison, it was confirmed that the difference of the diameters of the supply-side filter 8 and the collection-side filter 9 from the diameter of such a nozzle hole 17 as described above is effective for the inflow of foreign matter.

Figure 9A:
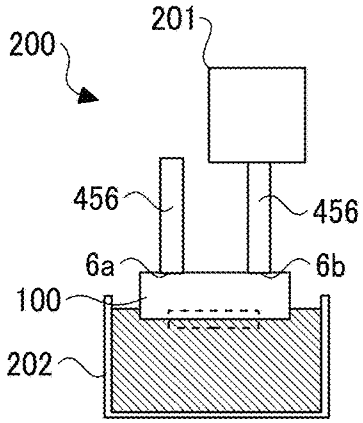
FIG. 9A is a view illustrating an exemplary configuration of a cleaning device of the present embodiment.
Figure 9B:
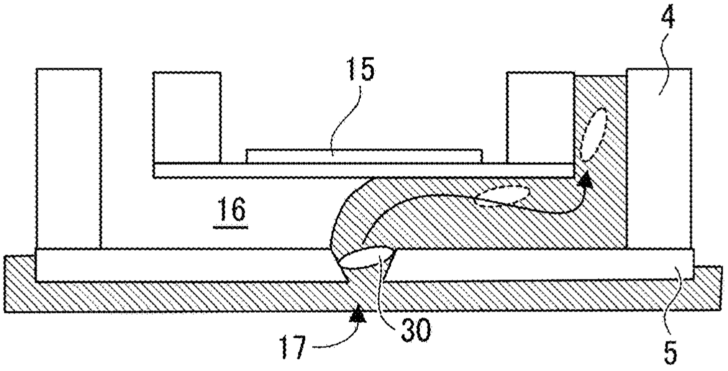
FIG. 9B is a view illustrating the exemplary configuration of the cleaning device of the present embodiment.

Further, in order to evaluate the recovery from clogging of the liquid discharge head 100, FIGS. 9A and 9B schematically illustrate the case of cleaning of the liquid discharge head 100 with a cleaning liquid such as a pure water. The cleaning in FIGS. 9A and 9B is performed to eliminate clogging of the nozzle hole 17. As illustrated in FIG. 9A, the position of the nozzle hole 17 of the liquid discharge head 100 is caused to land on the cleaning liquid and is sucked up by a pump 201 from the collection port 6*b*. Then, as illustrated in FIG. 9B as an enlarged view, foreign matter 30 clogged in the nozzle hole 17 is caused to flow to the collection side by backflow. In FIG. 9A, the pump 201 is connected to the supply port 6*a* and the collection port 6*b* of the liquid discharge head 100 through the tube 456, and the portion of the nozzle hole 17 of the liquid discharge head 100 is held above a cleaning-liquid storage bath 202 filled with the cleaning liquid. An apparatus including each of these mechanisms is illustrated as a liquid circulation apparatus 200.

Figure 10:
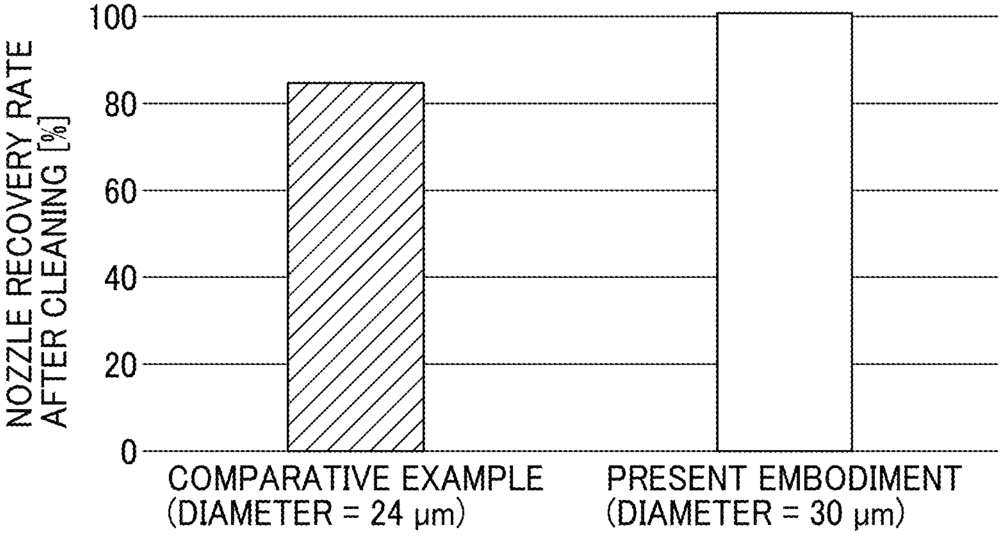
FIG. 10 illustrates an exemplary effect at the time of operation of the cleaning device in FIGS. 9A and 9B.

FIG. 10 illustrates the recovery rate (the number of channels with clogging eliminated to the number of channels with clogging occurred) of the nozzle holes 17 when pure water passed from the nozzle hole 17 side toward the collection-side filter 9 in the present example in which the diameter of the opening 19 of the collection-side filter 9 is 30 μm and the comparative example in which the diameter of the opening 19 of the collection-side filter 9 is 24 μm. As illustrated in FIG. 10, it was confirmed that the difference of the diameters of the supply-side filter 8 and the collection-side filter 9 from the diameter of such a nozzle hole 17 as described above is also effective in the inflow of foreign matter and the cleaning and discharge of the foreign matter after the inflow.

As described above, the liquid discharge head 100 in the present embodiment can also be provided as the liquid circulation apparatus 200 including the cleaner that sucks the cleaning liquid from the nozzle hole 17 and discharges the cleaning liquid from the collection port 6*b* to clean the nozzle hole 17 and the pressure chamber 16.

For a printing apparatus or the like including the liquid discharge head 100 as an ink head, for example, such a configuration can be used as a cleaner when a cleaning operation is performed for the ink head.

Figure 11:
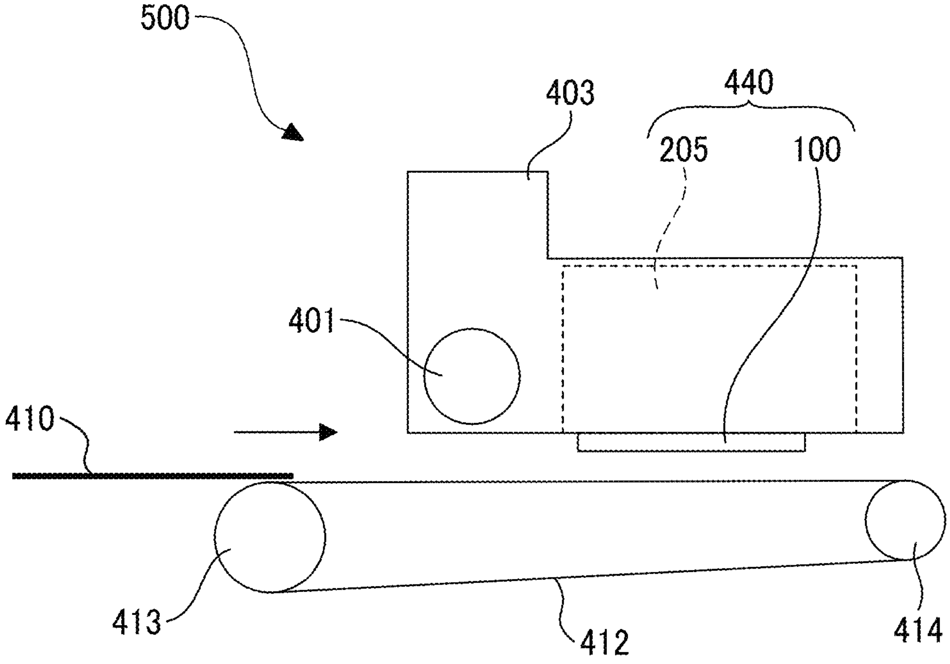
FIG. 11 is a view illustrating an exemplary configuration of a liquid discharge apparatus according to the present embodiment.
Figure 12:
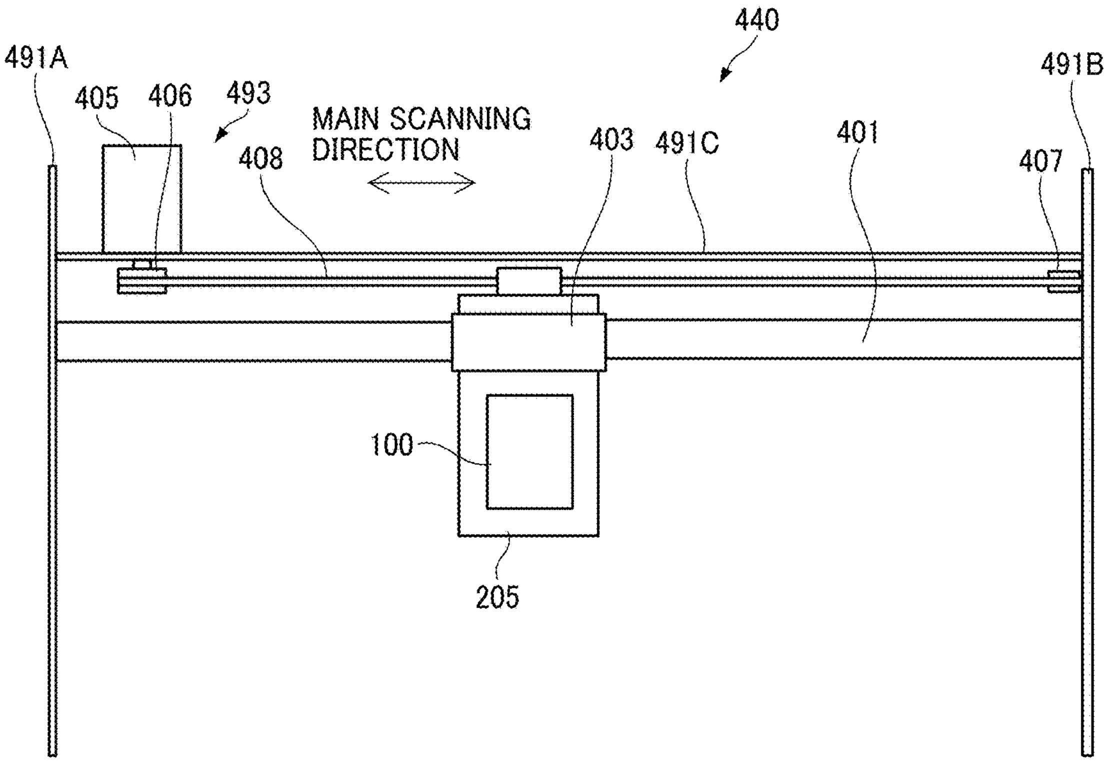
FIG. 12 is a view illustrating an exemplary configuration of a liquid discharge device according to the present embodiment.
Figure 13:
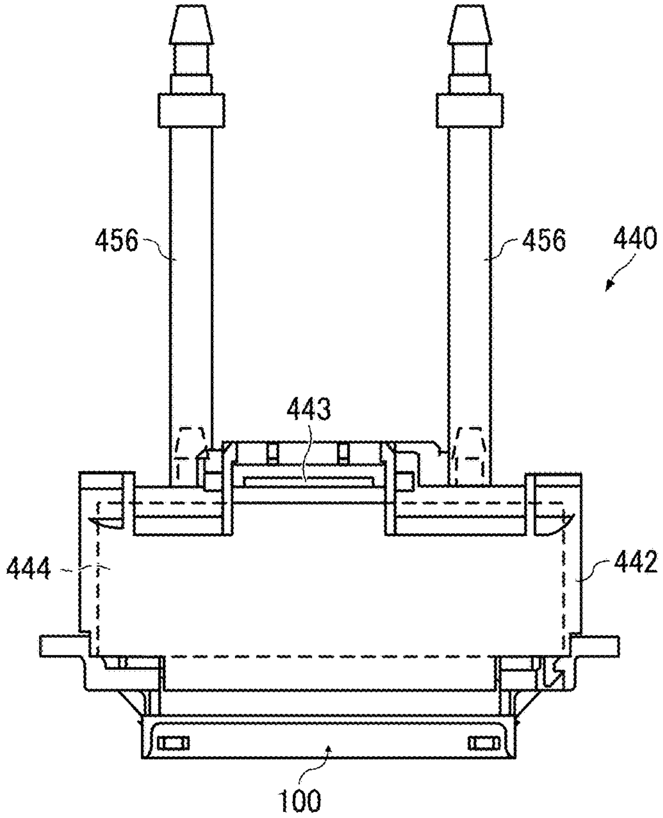
FIG. 13 is a view illustrating an exemplary configuration of a liquid discharge device according to the present embodiment.

Next, as the liquid discharge apparatus according to the present embodiment, an exemplary printing apparatus will be described with reference to FIGS. 11, 12, and 13. FIG. 11 is an explanatory side view of a main part of the liquid discharge apparatus as a printing apparatus 500. FIG. 12 is an explanatory plan view of the main part of the liquid discharge apparatus as the printing apparatus 500.

The printing apparatus 500 is a serial head apparatus and includes a carriage 403 and a main-scanning movement mechanism 493 illustrated in FIG. 12. The main-scanning movement mechanism 493 causes the carriage 403 to reciprocate in the main-scanning direction. The main-scanning movement mechanism 493 includes a guide member 401, a main-scanning motor 405, a timing belt 408. The guide member 401 is bridged between a left side plate 491A and a right side plate 491B to movably hold the carriage 403. The main-scanning motor 405 causes the carriage 403 to reciprocate in the main-scanning direction through the timing belt 408 stretched around a drive pulley 406 and a driven pulley 407.

The carriage 403 is mounted with a liquid discharge device 440 including a liquid discharge head 100 according to the present embodiment and an ink tank 205 for supplying ink to the liquid discharge head 100. The liquid discharge head 100 of the liquid discharge device 440 discharges liquid of each color of yellow (Y), cyan (C), magenta (M), and black (K) according to the connected ink tank 205. The liquid discharge head 100 is mounted with a nozzle array including a multiple nozzles. The nozzle array is disposed in the sub-scanning direction perpendicular to the main-scanning direction, and the discharge direction of the nozzle array is downward.

The liquid discharge head 100 is connected to the ink tank 205, and liquid of a desired color is circulated and supplied as described above.

The printing apparatus 500 further includes a conveyor for conveying a sheet 410 as a recording medium. The conveyor includes a conveyance belt 412 as conveyor, and a sub-scanning motor 416 for driving the conveyance belt 412.

The conveyance belt 412 attracts and conveys the sheet 410 to locate the sheet 410 opposite the liquid discharge head 100. The conveyance belt 412 is an endless belt stretched around a conveyance roller 413 and a tension roller 414. The attraction of the sheet 410 to the conveyance belt 412 may be applied by, for example, electrostatic attraction or air suction.

The conveyance belt 412 circumferentially runs in the sub-scanning direction due to rotationally driving of the conveyance roller 413 by the sub-scanning motor 416.

In the printing apparatus 500 having such a configuration, the sheet 410 is fed on and attracted to the conveyance belt 412, and is conveyed in the sub-scanning direction due to the circumferential run of the conveyance belt 412.

The liquid discharge head 100 is driven in response to an image signal while the carriage 403 moves in the main-scanning direction. The liquid discharge head 100 discharges liquid onto the sheet 410 remaining stopped to form an image on the sheet 410.

The liquid discharge device 440 includes a housing portion including the left side plate 491A, the right side plate 491B, and a back plate 491C; a main-scanning movement mechanism 493; the carriage 403; and the liquid discharge head 100, of the members included in the liquid discharge apparatus.

Next, still another example of the liquid discharge device according to the present embodiment will be described with reference to FIG. 13. FIG. 13 is a front view of a liquid discharge device 440 as the still another example.

The liquid discharge device 440 includes a liquid discharge head 100 with a channel part 444 attached thereto, and a tube 456 in connection with the channel part 444.

The channel part 444 is disposed inside a cover 442. Instead of the channel part 444, the liquid discharge device 440 may include an ink tank 205. The channel part 444 has an upper portion provided with a connector 443 that electrically connects to, for example, a printed circuit board 7 of the liquid discharge head 100.

According to the present embodiment, foreign matter having entered the head or a substance having been generated in the head can be easily discharged outside the head.

In the present application, liquid to be discharged may be any liquid as long as the liquid has viscosity and surface tension with which the liquid can be discharged from the head, and is not particularly limited to ink. The viscosity, however, is preferably 30 mPa·s or less at normal temperature and normal pressure, or by heating or cooling.

Examples of the liquid include a solution, a suspension, or an emulsion that contains, for example, a solvent such as water or an organic solvent; a colorant such as dye or pigment;

a functional material such as a polymerizable compound, a resin, or a surfactant; a biocompatible material such as deoxyribonucleic acid (DNA), amino acid, protein, or calcium; or an edible material such as a natural colorant.

Such a solution, a suspension, or an emulsion can be used for, e.g., inkjet ink, surface treatment solution, a liquid for forming components of an electronic element or a light-emitting element or a resist pattern of an electronic circuit, or a material solution for three-dimensional fabrication.

Examples of an energy generation source for discharging liquid include a piezoelectric actuator (layered piezoelectric element or thin-film piezoelectric element), a thermal actuator that employs a thermoelectric conversion element such as a heating resistor, and an electrostatic actuator including a diaphragm and opposed electrodes.

The "liquid discharge device" is an assembly of parts relating to liquid discharge. The term "liquid discharge device" used herein represents a structure including a liquid discharge head and a functional part(s) or unit(s) combined to the liquid discharge head to form a single unit.

For example, the "liquid discharge device" includes a combination of the liquid discharge head with at least one of a head tank, a carriage, a supply mechanism, a maintenance mechanism, a main-scanning movement mechanism, and a liquid circulation apparatus.

Examples of the "single unit" include a combination in which the liquid discharge head and one or more functional parts and units are secured to each other through, e.g., fastening, bonding, or engaging; and a combination in which one of the liquid head and the functional parts and units is held movably by another.

The liquid discharge head may be detachably attached to the functional part(s) or unit(s) each other.

For example, the liquid discharge head and the head tank may form the liquid discharge device as a single unit.

Alternatively, the liquid discharge head and the head tank coupled (connected) with a tube or the like may form the liquid discharge device as a single unit.

A unit including a filter may be added at a position between the head tank and the liquid discharge head of the liquid discharge device.

In another example, a liquid discharge head and a carriage may form the liquid discharge device as a single unit.

In still another example, a liquid discharge device includes a liquid discharge head held movably by a guide member included in part of a main-scanning movement mechanism, so that the liquid discharge head and the main-scanning movement mechanism form a single unit.

In yet another example, a liquid discharge device may include a liquid discharge head, a carriage, and a main-scanning movement mechanism that form a single unit.

In a further example, a cap member as part of a maintenance mechanism may be secured to a carriage with a liquid discharge head attached thereto, so that the liquid discharge head, the carriage, and the maintenance mechanism form a single unit as a liquid discharge device.

In a still further example, a tube is connected to a liquid discharge head with a head tank or a channel part attached to the liquid discharge head, so that the liquid discharge head and a supply mechanism form a single unit as a liquid discharge device. Liquid in a liquid reservoir source such as an ink cartridge is supplied to the liquid discharge head through the tube.

The "liquid discharge apparatus" includes an apparatus that includes a liquid discharge head or a liquid discharge device and that drives the liquid discharge head to discharge a liquid. The "liquid discharge apparatus" further includes apparatuses that discharge the liquid into gas (air) or liquid, in addition to apparatuses that discharge liquid to a material onto which the liquid can adhere.

The "liquid discharge apparatus" may include apparatuses that feeds, conveys, and eject a material onto which liquid can adhere. The liquid discharge apparatus may further include a pretreatment apparatus to coat a treatment liquid onto the material, and a post-treatment apparatus to coat a treatment liquid onto the material with the liquid discharged thereon.

The "liquid discharge apparatus" may be, for example, an image forming apparatus that discharges ink to form an image onto a sheet, or a three-dimensional fabrication apparatus that discharges a fabrication liquid to a powder layer with powder material formed in layers to form a three-dimensional fabrication object.

The "liquid discharge apparatus" is not limited to an apparatus that discharges liquid to visualize meaningful images, such as letters or figures. For example, the liquid discharge apparatus may include an apparatus that forms arbitrary images such as arbitrary patterns, or fabricate three-dimensional images.

The above term "material onto which liquid can adhere" represents a material onto which liquid can at least temporarily adhere, a material onto which liquid adheres to be fixed, or a material into which liquid adheres to permeate. Examples of the "material on which liquid can adhere" include recording media such as a sheet, recording paper, a recording sheet, a film, and cloth; an electronic component such as an electronic substrate and a piezoelectric element; and media such as a powder layer, an organ model, and a testing cell. The "material on which liquid can adhere" includes any material onto which liquid can adhere, unless particularly limited.

Examples of the "material onto which liquid can adhere" include any materials onto which liquid can adhere even temporarily, such as paper, thread, fiber, fabric, leather, metal, plastic, glass, wood, and ceramic.

The "liquid discharge apparatus" may be an apparatus that relatively moves the liquid discharge head and a material onto which liquid can adhere. The liquid discharge apparatus, however, is not limited to such an apparatus. For example, the liquid discharge apparatus may be a serial head apparatus that moves the liquid discharge head or a line head apparatus that does not move the liquid discharge head.

Examples of the "liquid discharge apparatus" further include a treatment liquid coating apparatus that discharges a treatment liquid to a sheet to coat, with the treatment liquid, a sheet surface to reform the sheet surface; and an injection granulation apparatus that injects, through nozzles, a composition liquid containing raw materials dispersed in a solution to granulate fine particles of the raw materials.

The terms "image formation", "recording", "printing", "image printing", and "fabrication" used herein may be used synonymously with each other.

Although the preferred modes of the present embodiment has been described above, the present embodiment is not limited to such a specific mode, and various modifications and changes can be made within the scope of the gist of the present embodiment described in the claims unless otherwise limited in the above description.

The effects described in the modes of the present embodiment are merely examples of the most preferable effects generated from the present embodiment, and the effects of the present embodiment are not limited to those described in the modes of the present embodiment.

[Aspect 1]

A liquid discharge head includes: multiple nozzles though which liquid is to be discharged, each of the multiple nozzles having a nozzle diameter; a multiple pressure chambers respectively communicating with the multiple nozzles; a supply common chamber communicating with each of the multiple pressure chambers to supply the liquid to each of the multiple pressure chambers; a collection common chamber communicating with each of the multiple pressure chambers to collect the liquid from the multiple pressure chambers; a supply port communicating with the supply common chamber to supply the liquid to the supply common chamber; a discharge port communicating with the collection common chamber to discharge the liquid from the collection common chamber; a first filter between the supply port and the pressure chamber, the first filter having first multiple openings each having a first diameter smaller than the nozzle diameter; and a second filter between the discharge port and the pressure chamber, the second filter having second multiple openings each having a second diameter larger than the nozzle diameter.

[Aspect 2]

In the liquid discharge head according to aspect 1, the first filter is between the supply port and the supply common chamber, and the second filter is between the discharge port and the collection common chamber.

[Aspect 3]

In the liquid discharge head according to aspect 1, a total opening area of the first multiple openings of the first filter is identical to a total opening area of the second multiple openings of the second filter.

[Aspect 4]

In the liquid discharge head according to aspect 1, the liquid passes through the first filter in a first direction toward the nozzle, the liquid passes through the second filter in a second direction away from the nozzle, each of the first multiple openings of the first filter has a tapered shape, the first diameter of each of the first multiple openings increases in the first direction, and each of the second multiple openings of the second filter has a tapered shape, the second diameter of each of the second multiple openings decreases in the second direction.

[Aspect 5]

A liquid discharge device includes: the liquid discharge head according to aspect 1; a carriage mounting the liquid discharge head; and a main-scanning movement mechanism configured to move the carriage in a main scanning direction.

[Aspect 6]

A liquid discharge apparatus includes the liquid discharge device according to aspect 5, and a conveyor configured to move a medium to a position facing the liquid discharge head.

[Aspect 7]

A liquid circulation apparatus includes: the liquid discharge head according to aspect 1; and a cleaner configured to suck a cleaning liquid from the multiple nozzles while discharging the cleaning liquid from the discharge port.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:
- multiple nozzles though which a liquid is to be discharged, each of the multiple nozzles having a nozzle diameter;
- a multiple pressure chambers respectively communicating with the multiple nozzles;
- a supply common chamber communicating with each of the multiple pressure chambers to supply the liquid to each of the multiple pressure chambers;
- a collection common chamber communicating with each of the multiple pressure chambers to collect the liquid from the multiple pressure chambers;
- a supply port communicating with the supply common chamber to supply the liquid to the supply common chamber;
- a discharge port communicating with the collection common chamber to discharge the liquid from the collection common chamber;
- a first filter between the supply port and the pressure chamber, the first filter having first multiple openings each having a first diameter smaller than the nozzle diameter; and
- a second filter between the discharge port and the pressure chamber, the second filter having second multiple openings each having a second diameter larger than the nozzle diameter,
- wherein a total opening area of the first multiple openings of the first filter is identical to a total opening area of the second multiple openings of the second filter.

2. The liquid discharge head according to claim 1, wherein;
- the first filter is between the supply port and the supply common chamber, and
- the second filter is between the discharge port and the collection common chamber.

3. The liquid discharge head according to claim 1, wherein:
- the liquid passes through the first filter in a first direction toward the nozzle,
- the liquid passes through the second filter in a second direction away from the nozzle,
- each of the first multiple openings of the first filter has a tapered shape, the first diameter of each of the first multiple openings increases in the first direction, and each of the second multiple openings of the second filter has a tapered shape, the second diameter of each of the second multiple openings decreases in the second direction.

4. A liquid discharge device comprising:

the liquid discharge head according to claim 1;

a carriage mounting the liquid discharge head; and a main-scanning movement mechanism configured to move the carriage in a main scanning direction.

5. A liquid discharge apparatus comprising:

the liquid discharge device according to claim 4, and a conveyor configured to move a medium to a position facing the liquid discharge head.

6. A liquid circulation apparatus comprising:

the liquid discharge head according to claim 1; and a cleaner configured to suck a cleaning liquid from the multiple nozzles while discharging the cleaning liquid from the discharge port.

7. A liquid discharge head comprising:

multiple nozzles though which a liquid is to be discharged, each of the multiple nozzles having a nozzle diameter;

a multiple pressure chambers respectively communicating with the multiple nozzles;

a supply common chamber communicating with each of the multiple pressure chambers to supply the liquid to each of the multiple pressure chambers;

a collection common chamber communicating with each of the multiple pressure chambers to collect the liquid from the multiple pressure chambers;

a supply port communicating with the supply common chamber to supply the liquid to the supply common chamber;

a discharge port communicating with the collection common chamber to discharge the liquid from the collection common chamber;

a first means for filtering between the supply port and the pressure chamber, the first means for filtering having first multiple openings each having a first diameter smaller than the nozzle diameter; and a second means for filtering between the discharge port and the pressure chamber, the second means for filtering having second multiple openings each having a second diameter larger than the nozzle diameter, wherein a total opening area of the first multiple openings of the first means for filtering is identical to a total opening area of the second multiple openings of the second means for filtering.

8. The liquid discharge head according to claim 7, wherein:

the first means for filtering is between the supply port and the supply common chamber, and the second means for filtering is between the discharge port and the collection common chamber.

9. The liquid discharge head according to claim 7, wherein:

the liquid passes through the first means for filtering in a first direction toward the nozzle, the liquid passes through the second means for filtering in a second direction away from the nozzle, each of the first multiple openings of the first means for filtering has a tapered shape, the first diameter of each of the first multiple openings increases in the first direction, and each of the second multiple openings of the second means for filtering has a tapered shape, the second diameter of each of the second multiple openings decreases in the second direction.

10. A liquid discharge device comprising:

the liquid discharge head according to claim 7;

a carriage mounting the liquid discharge head; and a main-scanning movement mechanism configured to move the carriage in a main scanning direction.

11. A liquid discharge apparatus comprising:

the liquid discharge device according to claim 10, and a conveyor configured to move a medium to a position facing the liquid discharge head.

12. A liquid circulation apparatus comprising:

the liquid discharge head according to claim 7; and a cleaner configured to suck a cleaning liquid from the multiple nozzles while discharging the cleaning liquid from the discharge port.

* * * * *